US011799678B1

(12) United States Patent
Liu et al.

(10) Patent No.: US 11,799,678 B1
(45) Date of Patent: Oct. 24, 2023

(54) ENHANCED VIDEO CONFERENCING BASED ON SPEECH DETECTION

(71) Applicant: Citrix Systems, Inc., Fort Lauderdale, FL (US)

(72) Inventors: Yeping Liu, Nanjing (CN); Fuping Zhou, Nanjing (CN); Youjun Gu, Nanjing (CN)

(*) Notice: Subject to any disclaimer, the term of this patent is extended or adjusted under 35 U.S.C. 154(b) by 0 days.

(21) Appl. No.: 17/660,883

(22) Filed: Apr. 27, 2022

Related U.S. Application Data

(63) Continuation of application No. PCT/CN2022/085223, filed on Apr. 5, 2022.

(51) Int. Cl.
*H04L 12/18* (2006.01)

(52) U.S. Cl.
CPC ...... *H04L 12/1827* (2013.01); *H04L 12/1831* (2013.01)

(58) Field of Classification Search
CPC .......... H04L 12/1827; H04L 12/1831
See application file for complete search history.

(56) References Cited

U.S. PATENT DOCUMENTS

| 7,653,250 | B2* | 1/2010 | Jeong | H04N 21/658 |
| | | | | 718/100 |
| 9,378,740 | B1* | 6/2016 | Rosen | G10L 15/1822 |
| 2011/0105190 | A1* | 5/2011 | Cha | G06F 40/274 |
| | | | | 704/235 |
| 2014/0122588 | A1* | 5/2014 | Nimri | H04L 12/1831 |
| | | | | 709/204 |
| 2016/0360206 | A1* | 12/2016 | Wu | H04N 19/179 |
| 2017/0280098 | A1* | 9/2017 | Sethuraman | H04L 12/1827 |
| 2018/0097854 | A1* | 4/2018 | Patel | H04L 65/1083 |

* cited by examiner

*Primary Examiner* — John A Follansbee
*Assistant Examiner* — Raqiul A Choudhury

(57) ABSTRACT

In one aspect, an example methodology implementing the disclosed techniques can include, by a computing device, receiving a video stream from a first client device and, responsive to a determination that a second client device activated a downgrade feature and further responsive to a determination that a user of the first client device is not speaking, modifying the video stream to consume less resources. The method can also include, by the computing device, providing the modified video stream to the second client device.

18 Claims, 6 Drawing Sheets

ENHANCED VIDEO CONFERENCING BASED ON SPEECH DETECTION

CROSS REFERENCE TO RELATED APPLICATION

This application is a continuation of and claims the benefit of PCT Patent Application No. PCT/CN2022/085223 filed on Apr. 5, 2022 in the English language in the State Intellectual Property Office and designating the United States, the contents of which are hereby incorporated herein by reference in its entirety.

BACKGROUND

Use of video conferencing is becoming prevalent. Video conferencing is a technology that enables users in different locations to engage in a live audio-visual call that simulates a face-to-face meeting. Various online meeting and conferencing services, such as TEAMS, SKYPE, ZOOM, GOTOMEETING, and WEBEX, may provide video conferencing among other features. To attend a video conference, a user may permit an online meeting application installed on their client device to access a video camera connected to, or otherwise associated with, the client device. Using the video camera, the online meeting application may capture and share a video stream that includes images of the user and/or the user's surrounding appearing within the camera's field of view.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

It is appreciated herein that the quality of network connections over which a video conference (or a "virtual" or "online" meeting) is conducted can negatively impact user experience. For example, a video conference conducted over a low-bandwidth or high-latency network connection may result in a video stream being compressed or distorted or otherwise resulting in a poor user experience. Because video and audio may be streamed over the same network connection, this can also result in degraded audio quality. Some online meeting services allow video conferencing to be selectively disabled (e.g., by disabling access to the video camera) which may improve the user's experience (e.g., by freeing up bandwidth for the audio stream). However, turning off the video feature may be undesirable since the other attendees of the virtual conference will no longer be able to view the user that disabled their video. Embodiments of the present disclosure can address the aforementioned technical problems by automatically modifying the video streams of one or more client devices of a video conference based on differentiating between speaking and non-speaking attendees.

In accordance with one example embodiment provided to illustrate the broader concepts, systems, and techniques described herein, a method includes, by a computing device, receiving a video stream from a first client device and, responsive to a determination that a second client device activated a downgrade feature and further responsive to a determination that a user of the first client device is not speaking, modifying the video stream to consume less resources. The method also includes, by the computing device, providing the modified video stream to the second client device.

In some embodiments, the method further comprises, responsive to a determination that the second client device has not activated the downgrade feature, providing, by the computing device, the video stream to the second client device.

In some embodiments, modifying the video stream includes modifying the video stream to a lower graphics quality. In some embodiments, modifying the video stream includes reencoding video data of the video stream to a smaller size.

In some embodiments, the determination that the second client device has activated the downgrade feature is based on a notification provided by the second client device. In some embodiments, the determination that the user of the first client device is not speaking is based on a notification provided by the first client device. In some embodiments, the determination that the user of the first client device is not speaking is based on an analysis of an audio stream provided by the first client device.

In some embodiments, the method further comprises, responsive to the determination that the user of the first client device is not speaking, by the computing device, adaptively modifying the video stream to consume less resources based on a monitored performance of the second client device and providing the adaptively modified video stream to the second client device.

According to another illustrative embodiment provided to illustrate the broader concepts described herein, a system includes a processor and a non-volatile memory storing computer program code that when executed on the processor, causes the processor to execute a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
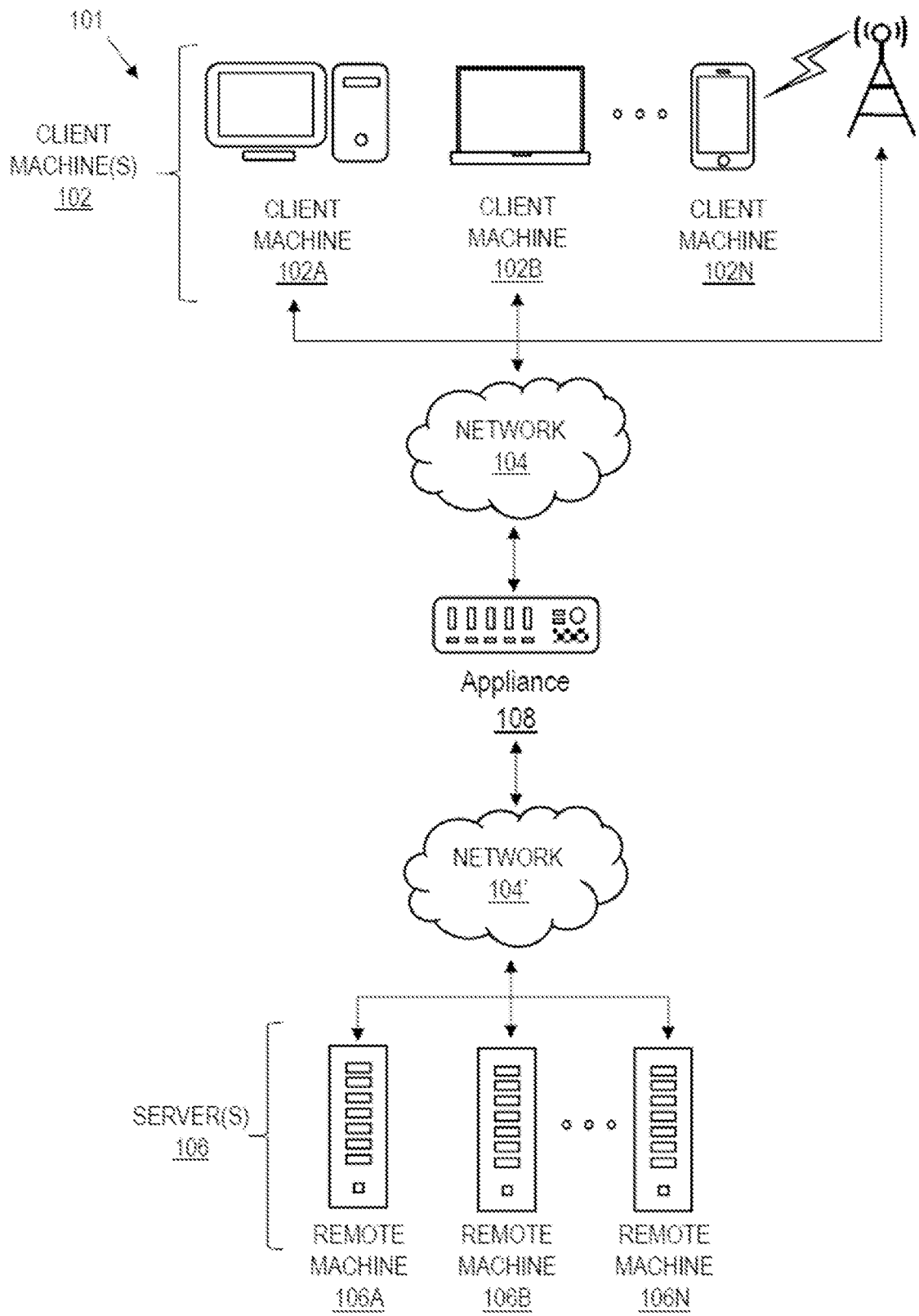
FIG. 1 is a diagram of an illustrative network computing environment in which embodiments of the present disclosure may be implemented.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
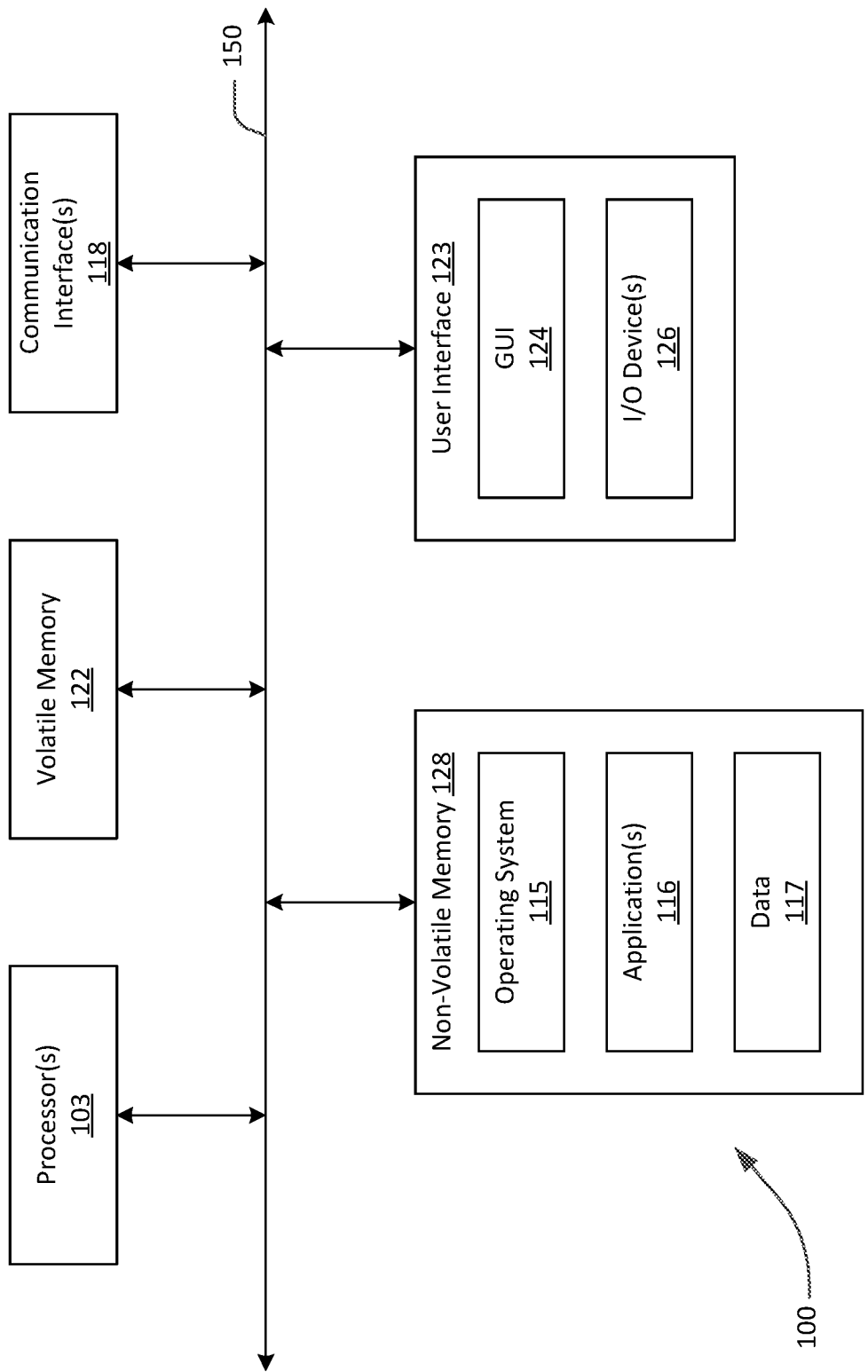
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
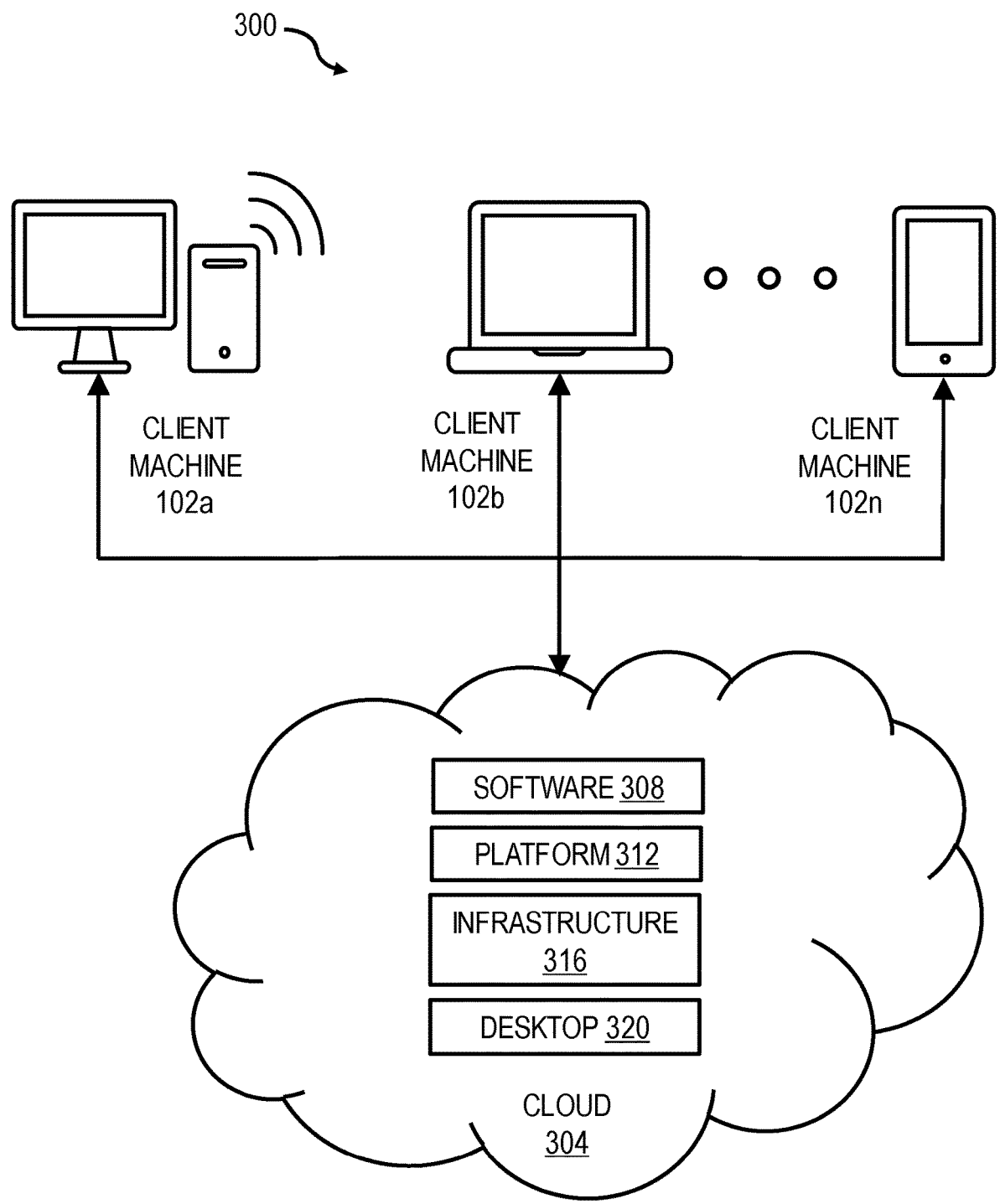
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g., Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
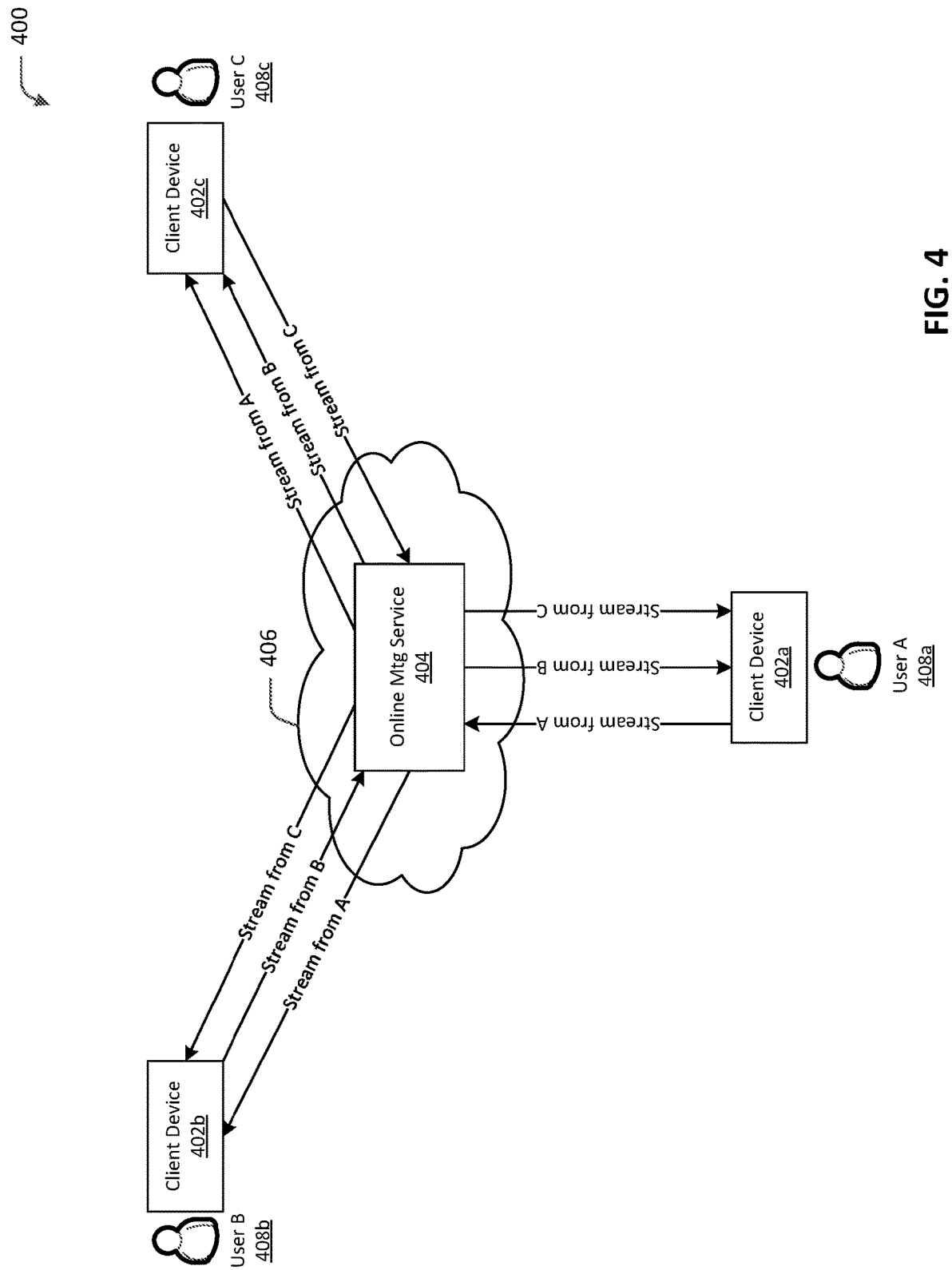
FIG. 4 is a diagram of an illustrative network environment in which enhanced video conferencing based on speech detection may be implemented, in accordance with an embodiment of the present disclosure.

FIG. 4 is a diagram of an illustrative network environment 400 in which enhanced video conferencing based on speech detection may be implemented, in accordance with an embodiment of the present disclosure. As shown, illustrative network environment 400 includes client devices 402a, 402b, 402c (402 generally) and an online meeting service (or "meeting service") 404. Client devices 402 may be configured to communicate with meeting service 404 via one or more computer networks 406 (e.g., via the Internet). Meeting service 404 may be provided as part of a cloud computing environment (e.g., cloud computing environment 300 of FIG. 3).

Client devices 402a, 402b, 402c may be used by or otherwise associated with users 408a, 408b, 408c (408 generally), respectively. Users 408 may correspond to attendees (or "participants") of an online meeting (sometimes referred to herein more simply as a "meeting") hosted by online meeting service 404. Client devices 402 can include, for example, desktop computing devices, laptop computing devices, tablet computing devices, and/or mobile computing devices. Client devices 402 can be configured to run one or more applications, such as desktop applications, mobile applications, and SaaS applications. Among various other types of applications, client devices 402 can run an online meeting application (sometimes referred to herein more simply as a "meeting application") that provides audio and video conferencing among other features. For example, client devices 402 can run TEAMS, SKYPE, ZOOM, GOTOMEETING, WEBEX, or another meeting application. The meeting application running on client devices 402 can communicate with meeting service 404. In some embodiments, a client device 402 may be the same or substantially similar to a client machine 102A-102N described above in the context of FIG. 1 and FIG. 3 and/or computing device 100 described above in the context of FIG. 2. While only three client devices 402 and three corresponding users 408a, 408b, 408c are shown in FIG. 5, the structures and techniques sought to be protected herein can be applied to any number of users and devices.

Figure 5:
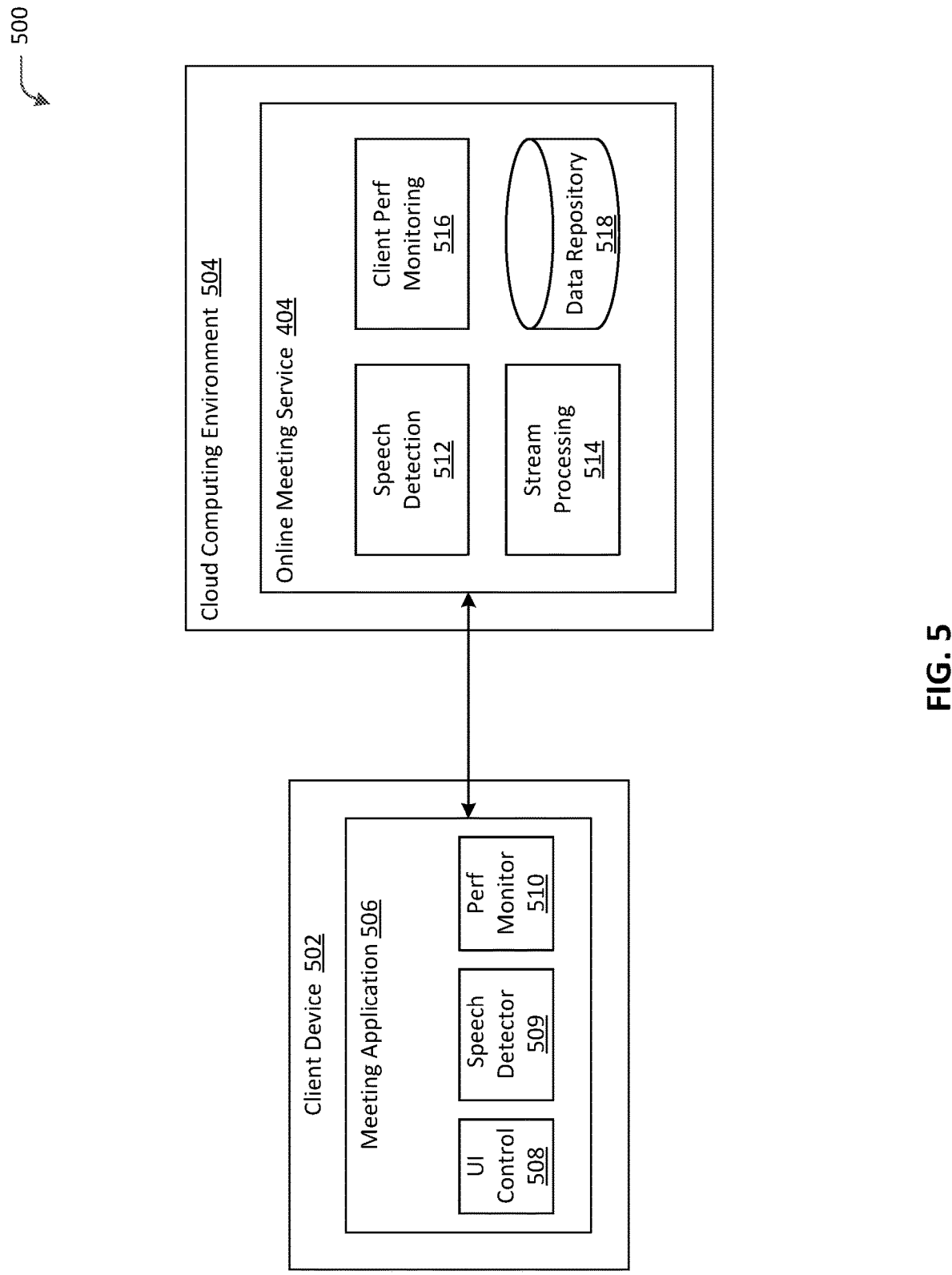
FIG. 5 is a block diagram of an illustrative system for enhanced video conference based on speech detection, in accordance with an embodiment of the present disclosure.

In the example of FIG. 5, user 408a may use client device 402a to join and attend an online meeting with users 408b, 408c using client devices 402b, 402c, respectively. During the meeting, the meeting application on client device 402a may provide (e.g., generate) a video stream captured by a camera connected to or otherwise associated with client device 402a. The video stream may show (e.g., include an appearance of) user 408a along with other objects that happen to be within the camera's field of view. The meeting application on client device 402a may also provide an audio stream of the sound (e.g., speech) detected by a microphone connected to or otherwise associated with client device 402a. The audio stream may include the audio from (i.e., speech or sounds made by) user 408a. Client device 402a may transmit or otherwise send the audio and video streams to meeting service 404 via network 406. Similarly, a meeting application on client device 402b may provide a video stream and audio stream associated with user 408b and transmit the audio and video streams to meeting service 404 via network 406, and a meeting application on client device 402c may provide a video stream and audio stream associated with user 408c and transmit the audio and video streams to meeting service 404 via network 406.

Meeting service 404 may provide collaboration and communication functionality to enable online meetings to occur between meeting attendees at various locations. In addition to functionality provided by existing collaboration services/applications, in response to receiving an audio/video stream from client device 402a, meeting service 404 can analyze the audio stream to detect the presence of speech within the audio stream contains speech or other sounds (e.g., detect speech from user 408a). In some embodiments, the received audio stream may include indications of sections of the audio stream that contain speech and sections of the audio stream that do not contain speech (e.g., the audio stream may include indications of the starting and ending of speech within the audio stream). In other embodiments, meeting service 404 can analyze the audio frames of the audio stream (e.g., audio stream data) to determine sections of the audio stream that contain speech. In any case, if meeting service 404 detects the presence of speech within the audio stream (e.g., determines that user 408a is speaking), meeting service 404 can transmit the audio/video stream received from client device 402a to client devices 402b, 402c (e.g., meeting service 404 can retransmit or forward to client devices 402b, 402c the audio/video stream received from client device 402a without modification).

Otherwise, if meeting service 404 detects an absence of speech within the audio stream (e.g., determines that user 408a is not speaking), meeting service 404 can modify the video stream to a lower quality video stream (e.g., downgrade the quality of the video stream received from client device 402a). For example, meeting service 404 can reencode the contents of the video stream received from client device 402a using an encoding format (e.g., MP4, QuickTime Movie (MOV), Audio Video Interleave (AVI), etc.) that produces a smaller video file. As another example, meeting service 404 can reencode the contents of the video stream received from client device 402a using video compression to reduce the overall size of the video file (e.g., meeting service 404 can reduce the resolution and/or lower the bitrate of the received video stream). Meeting service 404 can then transmit to client devices 402b, 402c the modified video stream with the audio stream received from client device 402a. A "modified video stream" according to the present disclosure may correspond to either a modification of an existing video stream (e.g., the received video stream) or to another video stream that is generated based on the existing video stream. Note that the modified video stream (or "downgraded video stream") consumes less resources (e.g., requires less network bandwidth to transmit and takes less time to upload) than the original video stream received from client device 402a since the modified video stream is of a lower quality. Meeting service 404 may process the audio/video streams received from client devices 402b, 402c in a manner similar to that described above for client device 402a.

In some embodiments, downgrading of the video stream may be provided as a user-selectable feature. For example, in one such embodiment, the meeting application on client device 402 can provide a UI element, such as a toggle switch, a checkbox, or a button, that allows a user (e.g., user 408) to selectively enable a video stream downgrade feature (sometimes referred to herein as more simply as a "downgrade feature"). The user can use the UI element to enable the downgrade feature to receive downgraded video streams of meeting attendees who are not speaking. In response to a user input to enable or disable the downgrade feature, the meeting application on client device 402 can send an indication to meeting service 404 notifying of the enabling or disabling of the downgrade feature on client device 402. In response to such indication, meeting service 404 can maintain a record of the enabling or disabling of the downgrade feature by the user. This enables meeting service 404 to share the modified video stream with the users (i.e., meeting attendees) who have enabled the downgrade feature. For example, prior to sending the modified video stream to client device 402, meeting service 404 can check to determine whether the downgrade feature is enabled for the user of client device 402. If the downgrade feature is enabled, meeting service 404 can transmit the modified video stream to client device 402. If the downgrade feature is disabled (i.e., the downgrade feature is not enabled), meeting service 404 can transmit the unmodified video stream (i.e., the original video stream) to client device 402.

In some embodiments, meeting service 404 may adaptively adjust the downgrading of a modified video stream transmitted to a client device. To this end, in some embodiments, for a particular client device 402 that is being used to attend the meeting, meeting service 404 can monitor the network performance of a connection to that client device 402. Meeting service 404 can then adaptively adjust the downgrading of the modified video stream(s) being transmitted to that client device 402 based on the monitored performance. For example, in response to determining that the performance is worsening over time, meeting service 404 may further downgrade the modified video stream(s) (e.g., further reduce the resolution and/or further lower the bitrate of the modified video stream(s)) being sent or otherwise provided to that client device 402. Conversely, in response to determining that the performance is improving over time, meeting service 404 may reduce the downgrading of the modified video stream(s) (e.g., increase the resolution and/or the bitrate of the modified video stream(s)) being sent or otherwise provided to that client device 402. In some embodiments, meeting service 404 can then adaptively adjust the downgrading of the video stream(s) transmitted to client device 402 based on the performance data provided by that client device 402. For example, during the meeting, client device 402 can collect information regarding the resources being consumed to process the video stream(s) (e.g., CPU usage, GPU usage, memory usage, time decoding and rendering the video streams, etc.) received from meeting service 404. Client device 402 can then provide the collected performance data to meeting service 404 to allow meeting service 404 to adaptively adjust the downgrading.

In some embodiments, for a particular client device 402 that is being used to attend an online meeting, meeting service 404 may enable the downgrade feature for that client device 402. For example, meeting service 404 can monitor the network performance of the connection to client device 402 and, if the monitored network performance does not satisfy a predetermined performance threshold, meeting service 404 can enable the downgrade feature for client device 402. Subsequently, if the monitored network performance improves and satisfies the predetermined performance threshold, meeting service 404 can disable the downgrade feature for client device 402. The performance threshold may be configurable by the user of client device 402 (e.g., user 408) and/or meeting service 404. Additionally or alternatively, client devices 402 that are being used to attend an online meeting may send to meeting service 404 performance data about the resources being consumed to process the video stream(s) received from meeting service 404. Then, for a particular client device 402, meeting service 404 can enable or disable the downgrade feature on client device 402 based on the performance data received from that client device 402.

Turning to FIG. 5 and with continued reference to FIG. 4, shown is a block diagram of an illustrative system 500 for video conference enhancement based on speech detection, in accordance with an embodiment of the present disclosure. Illustrative system 500 includes a client device 502 communicably coupled to online meeting service 404 provided within a cloud computing environment 504. Client device 502 can correspond to any or all of client devices 402 of FIG. 4. Cloud computing environment 504 can be the same or similar to cloud computing environment 300 of FIG. 3.

Illustrative client device 502 can include an online meeting application (or "meeting application") 506 among various other applications. Meeting application 506 may correspond to TEAMS, SKYPE, ZOOM, GOTOMEETING, WEBEX, or another application that can provide video conferencing. Meeting application 506 may connect to online meeting service 404 via one or more computer networks (e.g., network 406) to join online meetings hosted thereby.

To promote clarity in the drawings, FIG. 5 shows a single meeting application 506 communicably coupled to meeting service 404. However, embodiments of meeting service 404 can be used to service many meeting applications 506 used by many different users attending many different meetings hosted by meeting service 404. Meeting application 506 and/or meeting service 404 may be implemented as computer instructions executable to perform the corresponding functions disclosed herein.

The client-side meeting application 506 can communicate with cloud-side meeting service 404 using an API. For example, meeting application 506 can send API requests (or "messages") or other communications to meeting service 404 wherein the messages/communications are received and processed by meeting service 404 or a component of meeting service 404. Likewise, meeting service 404 or a component of meeting service 404 can send API messages/communications (e.g., responses) to meeting application 506 wherein the messages/communications are received and processed by meeting application 506 or a component of meeting application 506.

In the example of FIG. 5, meeting application 506 can include a UI control 508, speech detector 509, and a performance monitor 510. UI control 508 may be a control, such as a toggle switch, a button, a checkbox, or other type of control, provided on a UI or window of meeting application 506 for selectively enabling a downgrade feature provided by meeting service 404. For example, a user (e.g., user 408) can use UI control 508 to enable or disable the downgrade feature. In response to the user clicking/tapping on such a toggle switch, meeting application 506 can send a message to meeting service 404 indicating the enabling or disabling of the downgrade feature on client device 502.

Speech detector 509 can be provided as a submodule or other component of meeting application 506. Speech detector 509 is configured to detect the presence of speech during a meeting. As described above, during a meeting hosted by meeting service 404, meeting application 506 can provide an audio stream to meeting service 404. The audio stream can be composed of a sequence of audio frames. In some embodiments, prior to transmitting the audio stream, speech detector 509 can analyze individual audio frames or groups of audio frames within the audio stream to detect the presence or absence of speech. For example, speech detector 509 can utilize voice activity detection (VAD) or other suitable speech detection technology to detect the presence or absence of speech within the audio stream. Speech detector 509 can then indicate the sections of the audio stream that contain speech and the sections of the audio stream that do not contain speech (i.e., indicate the speech sections and the non-speech sections within the audio stream). Subsequent to such processing by speech detector 509, meeting application 506 may transmit the audio stream that includes indications of speech and non-speech sections to meeting service 404.

Performance monitor 510 can be provided as a submodule or other component of meeting application 506. Performance monitor 510 is configured to monitor and collect information regarding the resource being consumed to process the video streams received from meeting service 404. For example, when meeting application 506 is being used to attend a meeting, performance monitor 510 may monitor various activities on client device 502 to process the video streams received from meeting service 404, such as CPU usage, GPU usage, memory usage, and time taken to decode and render the video streams, to provide a few examples. Performance monitor 510 can then send the collected information regarding the monitored activities (e.g., the collected performance data) to meeting service 404.

In some embodiments, performance monitor 510 can collect and send the information regarding the resources being consumed to process the received video steams on a continuous or periodic basis (e.g., according to a predetermined schedule such as, for example, every 10 seconds, 15 seconds, 20 seconds, or any other suitable period of time). The schedule may be configurable by the user of meeting application 506 (e.g., user 408) and/or meeting service 404.

As mentioned previously, meeting service 404 can be provided within cloud computing environment 504. In some embodiments, meeting service 404 can be provided as a service (e.g., a microservice) within cloud clouding environment 504. Meeting service 404 can be logically and/or physically organized into one or more components. In the example of FIG. 5, meeting service 404 includes a speech detection module, 512, a stream processing module 514, a client performance monitoring module 516, and a data repository 518.

Speech detection module 512 is operable to determine whether a meeting attendee (e.g., a person attending a meeting) is speaking or not speaking. As described above, during a meeting hosted by meeting service 404, client device 502 and, in particular, meeting application 506 on client device 502 that is being used to attend the meeting may send an audio/video stream to meeting service 404. Speech detection module 512 can analyze the audio stream from client device 502 to determine whether the audio stream contains speech (e.g., determine whether person attending the meeting using client device 502 is speaking). In some embodiments, speech detection module 512 can make such determination from the contents of the audio stream. For example, the audio stream from client device 502 may include indications of sections of the audio stream that contain speech and sections of the audio stream that do not contain speech. Additionally or alternatively, speech detection module 512 can analyze the audio frames of the audio stream from client device 502 to determine sections of the audio stream that contain speech. For example, speech detection module 512 can utilize VAD or other suitable speech detection technology to detect the presence or absence of speech within the audio stream.

In response to speech detection module 512 detecting the presence of speech within the audio stream, stream processing module 514 can transmit the audio/video stream received from client device 502 to the other client devices being used to attend the meeting (e.g., the client devices associated with the other meeting attendees). In other words, the audio/video stream received from client device 502 may be shared with the client devices associated with the other meeting attendees. In some embodiments, stream processing module 514 may store the audio/video stream received from client device 502 within data repository 518 that can correspond to, for example, a storage service within cloud computing environment 504.

In response to speech detection module 512 detecting the absence of speech within the audio stream (i.e., not detecting the presence of speech within the audio stream), stream processing module 514 can modify the video stream received from client device 502 or generate another video stream in which the quality of the video is lowered (e.g., generate a modified video stream in which the quality of the video is downgraded). For example, stream processing module 514 can reencode the contents of the video stream received from client device 502 using an encoding format, such as MP4, MOV, AVI, or another suitable encoding format, that produces a smaller video file. As another example, stream processing module 514 can reencode the contents of the video stream received from client device 502 using video compression (e.g., reduce the resolution and/or lower the bitrate of the received video stream) to reduce the overall size of the video file. Stream processing module 514 can then transmit the modified video stream with the audio stream received from client device 502 to the other client devices being used to attend the meeting. In other words, the video stream modified/generated by stream processing module 514 may be shared with the client devices associated with the other meeting attendees in place of the video stream received from client device 502. In some embodiments, stream processing module 514 may store modified/generated video stream within data repository 518.

In some embodiments, stream processing module 514 may check to determine whether a meeting attendee has enabled the downgrade feature prior to transmitting or otherwise providing a modified video stream to a computing device associated with the meeting attendee. For example, in one embodiment, meeting service 404 may maintain a record of the meeting attendees who have enabled (or disabled) the downgrade feature in data repository 518. In such embodiments, for a particular client device associated with a meeting attendee, stream processing module 514 can first check the records maintained in data repository 518 to determine whether the meeting attendee has enabled the downgrade feature. If the downgrade feature is disabled for the meeting attendee, stream processing module 514 can transmit the audio/video stream received from client device 502 to the client device. Otherwise, if the downgrade feature is enabled for the meeting attendee, stream processing module 514 can transmit the modified video stream with the audio stream received from client device 502 to the client device.

Still referring to FIG. 5, client performance monitoring module 516 is operable to monitor network performance and adaptively adjust the downgrading of the modified video stream being transmitted to client device 502. For example, client performance monitoring module 516 can collect network performance data (e.g., bandwidth, throughput, latency, round-trip time, error rate, etc.) of the connection to client device 502. Client performance monitoring module 516 can then adaptively adjust the downgrading of the modified video stream(s) being transmitted to client device 502 based on the collected network performance data. As an example, if the collected performance data indicates a worsening of the network connection, performance monitoring module 516 may further downgrade the modified video stream(s) (e.g., further reduce the resolution and/or further lower the bitrate of the modified video stream(s)) being transmitted to client device 502. Conversely, if the collected performance data indicates an improvement of the network connection, client performance monitoring module 516 may reduce the downgrading of the modified video stream(s) (e.g., increase the resolution and/or the bitrate of the modified video stream(s)) being transmitted to client device 502.

In some embodiments, client performance monitoring module 516 is operable to adaptively adjust the downgrading of modified video stream based on the performance of the client device receiving the video stream. For example, during the meeting, client device 502 may provide information regarding the resources being consumed by client device 502 to process the video stream(s) (e.g., CPU usage, GPU usage, memory usage, time decoding and rendering the video streams, etc.) received from meeting service 404. Client performance monitoring module 516 can use the performance data provided by client device 502 to adaptively adjust the downgrading of the modified video stream(s) being transmitted to client device 502. For example, if the provided performance data indicates that the performance of client device 502 is poor, performance monitoring module 516 may further downgrade the modified video stream(s) (e.g., further reduce the resolution and/or further lower the bitrate of the modified video stream(s)) being transmitted to client device 502.

In some embodiments, client performance monitoring module 516 may enable the downgrade feature for client device 502 based on the performance of the connection to client device 502. For example, client performance monitoring module 516 can collect network performance data (e.g., bandwidth, throughput, latency, round-trip time, error rate, etc.) of the connection to client device 502. In response to determining that the performance data (i.e., the monitored network performance) does not satisfy a predetermined performance threshold, client performance monitoring module 516 can enable the downgrade feature for client device 402. Client performance monitoring module 516 can continue collecting the network performance data and, in response to determining that the performance data satisfies the predetermined performance threshold, client performance monitoring module 516 can disable the downgrade feature for client device 402.

Figure 6:
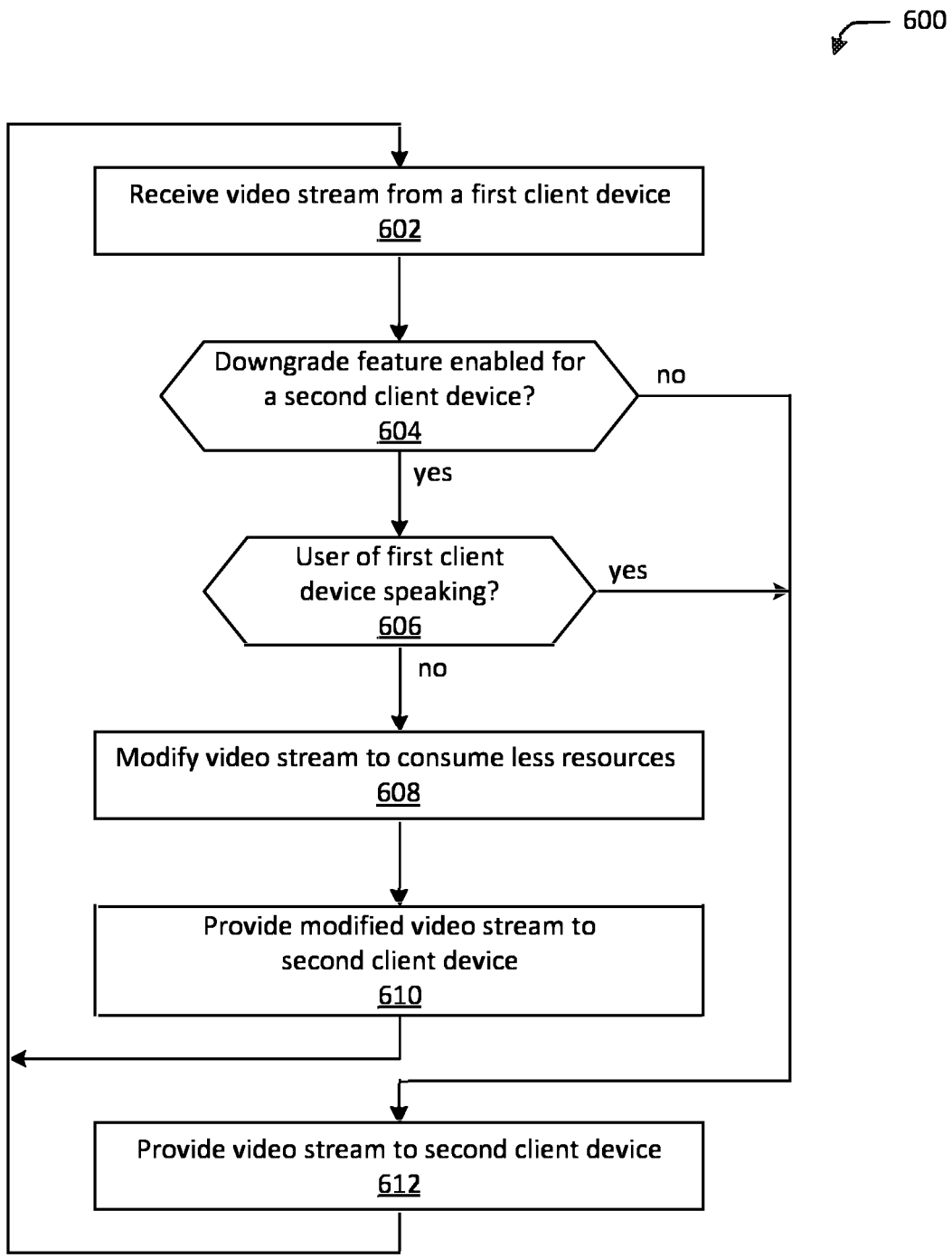
FIG. 6 is a flow diagram of an illustrative process for enhancing a video conference based on speech detection, in accordance with an embodiment of the present disclosure.

FIG. 6 is a flow diagram of an illustrative process 600 for enhancing a video conference based on speech detection, in accordance with an embodiment of the present disclosure. Process 600 may be implemented, for example, within a cloud computing service, such as online meeting service 404 of FIGS. 4 and 5.

Referring to process 600, at 602, a video stream can be received from a first client device. For example, the video stream may be received from the first client device (e.g., client device 402a of FIG. 4) by an online meeting service (e.g., meeting service 404 of FIGS. 4 and 5) during an online meeting being hosted by the meeting service. The first client device may be being used by a user (e.g., user 408a of FIG. 4) to attend the online meeting and the video stream may show the user of the first client device.

At 604, a check can be made to determine whether a downgrade feature is enabled for a second client device. The second client device (e.g., client device 402b of FIG. 4) may be being used by a user (e.g., user 408b of FIG. 4) to attend the same online meeting being attended by the user of the first client device.

If it is determined that the downgrade feature is enabled for the second client device, at 606, a check can be made to determine whether the user of the first client device is speaking. A speech detection module of the meeting service (e.g., speech detection module 512 of FIG. 5) may analyze a corresponding audio stream received from the first client device to determine whether the user of the first client device is speaking.

If it is determined that the user of the first client device is not speaking, at 608, the original video stream received from the first client device can be modified to consume less resources. The original video stream may be modified by a stream processing module of the meeting service (e.g., stream processing module 514 of FIG. 5). In some embodiments, the resources may be network resources needed to transmit the video stream (e.g., the modified video stream) to the second client device. In some embodiments, the resources may the computing resources needed to process the video stream (e.g., the modified video stream) received the second client device.

At 610, the modified video stream can be provided to the second client device. The modified video stream (e.g., the downgraded video stream) may be transmitted to the second client device by the stream processing module of the meeting service. Since the downgrade feature is enabled for the second client device and the user of the first client device is not speaking, the modified video stream is shared with the second client device in place of the original video stream from the first client device. The meeting service can then continue processing other video streams received from client devices being used to attend the online meeting (e.g., continue processing at block 622).

Otherwise, if, at 606, it is determined that the user of the first client device is speaking, at 612, the video stream received from the first client device can be provided (e.g., transmitted) to the second client device. The original video stream received from the first client device may be transmitted to the second client device by the stream processing module of the meeting service. Since the user of the first client device is speaking, the video stream received from the first client device is not modified and the original video stream from the first client device is shared with the second client device. The meeting service can then continue processing other video streams received from client devices being used to attend the online meeting (e.g., continue processing at block 622).

Otherwise, if, at 604, it is determined that the downgrade feature is not enabled (e.g., is disabled) for the second client device, at 612, the video stream received from the first client device can be provided (e.g., transmitted) to the second client device. The original video stream received from the first client device may be transmitted to the second client device by the stream processing module of the meeting service. Since the downgrade feature is not enabled for the second client device, the video stream received from the first client device is not modified and the original video stream from the first client device is shared with the second client device. The meeting service can then continue processing other video streams received from client devices being used to attend the online meeting (e.g., continue processing at block 622).

Further Example Embodiments

The following examples pertain to further embodiments, from which numerous permutations and configurations will be apparent.

Example 1 includes a method including: receiving, by a computing device, a video stream from a first client device; and responsive to a determination that a second client device activated a downgrade feature: and responsive to a determination that a user of the first client device is not speaking: modifying, by the computing device, the video stream to consume less resources; and providing, by the computing device, the modified video stream to the second client device.

Example 2 includes the subject matter of Example 1, further including, responsive to a determination that the second client device has not activated the downgrade feature, providing, by the computing device, the video stream to the second client device.

Example 3 includes the subject matter of any of Examples 1 and 2, wherein modifying the video stream includes modifying the video stream to a lower graphics quality.

Example 4 includes the subject matter of any of Examples 1 through 3, wherein modifying the video stream includes reencoding video data of the video stream to a smaller size.

Example 5 includes the subject matter of any of Examples 1 through 4, wherein the determination that the second client device has activated the downgrade feature is based on a notification provided by the second client device.

Example 6 includes the subject matter of any of Examples 1 through 5, wherein the determination that the user of the first client device is not speaking is based on a notification provided by the first client device.

Example 7 includes the subject matter of any of Examples 1 through 6, wherein the determination that the user of the first client device is not speaking is based on an analysis of an audio stream provided by the first client device.

Example 8 includes the subject matter of any of Examples 1 through 7, further including, responsive to the determination that the user of the first client device is not speaking: adaptively modifying, by the computing device, the video stream to consume less resources based on a monitored performance of the second client device; and providing, by the computing device, the adaptively modified video stream to the second client device.

Example 9 includes a system including a processor and a non-volatile memory storing computer program code that when executed on the processor causes the processor to execute a process operable to: receive a video stream from a first client device; and responsive to a determination that a second client device activated a downgrade feature: and responsive to a determination that a user of the first client device is not speaking: modify the video stream to consume less resources; and provide the modified video stream to the second client device.

Example 10 includes the subject matter of Example 9, wherein the process is further operable to, responsive to a determination that the second client device has not activated the downgrade feature, provide the video stream to the second client device.

Example 11 includes the subject matter of any of Examples 9 and 10, wherein to modify the video stream includes to modify the video stream to a lower graphics quality.

Example 12 includes the subject matter of any of Examples 9 through 11, wherein to modify the video stream includes to reencode video data of the video stream to a smaller size.

Example 13 includes the subject matter of any of Examples 9 through 12, wherein the determination that the second client device has activated the downgrade feature is based on a notification provided by the second client device.

Example 14 includes the subject matter of any of Examples 9 through 13, wherein the determination that the user of the first client device is not speaking is based on a notification provided by the first client device.

Example 15 includes the subject matter of any of Examples 9 through 14, wherein the determination that the user of the first client device is not speaking is based on an analysis of an audio stream provided by the first client device.

Example 16 includes the subject matter of any of Examples 9 through 15, wherein the process is further operable to, responsive to the determination that the user of the first client device is not speaking: adaptively modify the video stream to consume less resources based on a monitored performance of the second client device; and provide the adaptively modified video stream to the second client device.

Example 17 includes a non-transitory machine-readable medium encoding instructions that when executed by one or more processors cause a process to be carried out. The process includes: receiving a video stream from a first client device; and responsive to a determination that a second client device activated a downgrade feature: and responsive to a determination that a user of the first client device is not speaking: modifying the video stream to consume less resources; and providing the modified video stream to the second client device.

Example 18 includes the subject matter of Example 17, wherein the process further includes, responsive to a determination that the second client device has not activated the downgrade feature, providing, by the computing device, the video stream to the second client device.

Example 19 includes the subject matter of any of Examples 17 and 18, wherein modifying the video stream includes modifying the video stream to a lower graphics quality.

Example 20 includes the subject matter of any of Examples 17 through 19, wherein modifying the video stream includes reencoding video data of the video stream to a smaller size.

Example 21 includes the subject matter of any of Examples 17 through 20, wherein the determination that the second client device has activated the downgrade feature is based on a notification provided by the second client device.

Example 22 includes the subject matter of any of Examples 17 through 21, wherein the determination that the user of the first client device is not speaking is based on a notification provided by the first client device.

Example 23 includes the subject matter of any of Examples 17 through 22, wherein the determination that the user of the first client device is not speaking is based on an analysis of an audio stream provided by the first client device.

Example 24 includes the subject matter of any of Examples 17 through 23, wherein the process further includes, responsive to the determination that the user of the first client device is not speaking: adaptively modifying, by the computing device, the video stream to consume less resources based on a monitored performance of the second client device; and providing, by the computing device, the adaptively modified video stream to the second client device.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
  receiving, by a computing device, a video stream from a first client device; and
  responsive to a determination that a second client device activated a downgrade feature:
  responsive to a determination that a user of the first client device is not speaking:
    modifying, by the computing device, the video stream to consume less resources;

providing, by the computing device, the modified video stream to the second client device;
adaptively modifying, by the computing device, the video stream to consume less resources based on a monitored performance of the second client device; and
providing, by the computing device, the adaptively modified video stream to the second client device.

2. The method of claim 1, further comprising, responsive to a determination that the second client device has not activated the downgrade feature, providing, by the computing device, the video stream to the second client device.

3. The method of claim 1, wherein modifying the video stream includes modifying the video stream to a lower graphics quality.

4. The method of claim 1, wherein modifying the video stream includes reencoding video data of the video stream to a smaller size.

5. The method of claim 1, wherein the determination that the second client device has activated the downgrade feature is based on a notification provided by the second client device.

6. The method of claim 1, wherein the determination that the user of the first client device is not speaking is based on a notification provided by the first client device.

7. The method of claim 1, wherein the determination that the user of the first client device is not speaking is based on an analysis of an audio stream provided by the first client device.

8. A system comprising:
a processor; and
a non-volatile memory storing computer program code that when executed on the processor causes the processor to execute a process operable to:
receive a video stream from a first client device; and
responsive to a determination that a second client device activated a downgrade feature:
responsive to a determination that a user of the first client device is not speaking:
modify the video stream to consume less resources;
provide the modified video stream to the second client device;
adaptively modify the video stream to consume less resources based on a monitored performance of the second client device; and
provide the adaptively modified video stream to the second client device.

9. The system of claim 8, wherein the process is further operable to, responsive to a determination that the second client device has not activated the downgrade feature, provide the video stream to the second client device.

10. The system of claim 8, wherein to modify the video stream includes to modify the video stream to a lower graphics quality.

11. The system of claim 8, wherein to modify the video stream includes to reencode video data of the video stream to a smaller size.

12. The system of claim 8, wherein the determination that the second client device has activated the downgrade feature is based on a notification provided by the second client device.

13. The system of claim 8, wherein the determination that the user of the first client device is not speaking is based on a notification provided by the first client device.

14. The system of claim 8, wherein the determination that the user of the first client device is not speaking is based on an analysis of an audio stream provided by the first client device.

15. A non-transitory machine-readable medium encoding instructions that when executed by one or more processors cause a process to be carried out, the process comprising:
receiving a video stream from a first client device; and
responsive to a determination that a second client device activated a downgrade feature:
responsive to a determination that a user of the first client device is not speaking:
modifying the video stream to consume less resources;
providing the modified video stream to the second client device;
adaptively modifying, by the computing device, the video stream to consume less resources based on a monitored performance of the second client device; and
providing, by the computing device, the adaptively modified video stream to the second client device.

16. The machine-readable medium of claim 15, wherein the process further comprises, responsive to a determination that the second client device has not activated the downgrade feature, providing the video stream to the second client device.

17. The machine-readable medium of claim 15, wherein modifying the video stream includes one of modifying the video stream to a lower graphics quality or reencoding video data of the video stream to a smaller size.

18. The machine-readable medium of claim 15, wherein the determination that the user of the first client device is not speaking is based on one of a notification provided by the first client device or an analysis of an audio stream provided by the first client device.

* * * * *